United States Patent
Sun et al.

(10) Patent No.: US 12,289,272 B2
(45) Date of Patent: Apr. 29, 2025

(54) METHOD AND APPARATUS FOR RESOURCE RESERVATION FOR NR SIDELINK

(71) Applicant: Lenovo (Beijing) Ltd., Beijing (CN)

(72) Inventors: Zhennian Sun, Chaoyang District (CN); Xiaodong Yu, Haidian District (CN); Haipeng Lei, Haidian District (CN); Xin Guo, Haidian District (CN); Haiming Wang, Xicheng District (CN)

(73) Assignee: Lenovo (Beijing) Ltd., Beijing (CN)

( * ) Notice: Subject to any disclaimer, the term of this patent is extended or adjusted under 35 U.S.C. 154(b) by 338 days.

(21) Appl. No.: 17/789,493

(22) PCT Filed: Jan. 3, 2020

(86) PCT No.: PCT/CN2020/070324
§ 371 (c)(1),
(2) Date: Jun. 27, 2022

(87) PCT Pub. No.: WO2021/134793
PCT Pub. Date: Jul. 8, 2021

(65) Prior Publication Data
US 2023/0036504 A1 Feb. 2, 2023

(51) Int. Cl.
*H04L 5/00* (2006.01)
*H04L 1/1825* (2023.01)

(52) U.S. Cl.
CPC .......... *H04L 5/0055* (2013.01); *H04L 1/1825* (2013.01)

(58) Field of Classification Search
CPC ... H04L 5/0055; H04L 1/1825; H04L 5/0094; H04L 1/1614; H04L 1/1861; H04W 72/23
See application file for complete search history.

(56) References Cited

U.S. PATENT DOCUMENTS

2019/0037545 A1* 1/2019 Jiao ................ H04W 76/30
2019/0324814 A1* 10/2019 Wu ................ G06F 3/0608
(Continued)

FOREIGN PATENT DOCUMENTS

CN    109314615 A    2/2019
WO    2019074410 A1  4/2019
(Continued)

OTHER PUBLICATIONS

3GPP TSG RAN WG1 #97 ; R1-1906368; Source: Spreadtrum Communications; Title: Discussion on NR sidelink mode 2 resource allocation; Reno, USA, May 13-May 17, 2019 (Year: 2019).*
(Continued)

*Primary Examiner* — Mohammed S Chowdhury
(74) *Attorney, Agent, or Firm* — FIG. 1 Patents

(57) ABSTRACT

Embodiments of the present application are related to a method and apparatus for resource reservation for 3GPP 5G New Radio (NR) sidelink (SL). A method for wireless communication performed by a user equipment (UE) according to an embodiment of the present application includes: transmitting a code block group (CBG)-based transmission on a SL, wherein the CBG-based transmission includes one or more CBGs; receiving hybrid automatic repeat request-acknowledge (HARQ-ACK) feedback corresponding to the one or more CBGs; and determining, based on contents of the HARQ-ACK feedback, whether there is resource(s) to be released during a CBG-based retransmission.

20 Claims, 6 Drawing Sheets

(56) References Cited

U.S. PATENT DOCUMENTS

| | | | | |
|---|---|---|---|---|
| 2020/0404560 A1* | 12/2020 | Zhang | ............... | H04W 72/0453 |
| 2021/0099919 A1* | 4/2021 | Sarkis | ................... | H04W 28/26 |
| 2021/0336728 A1* | 10/2021 | Selvanesan | ........... | H04L 1/1825 |
| 2022/0007403 A1* | 1/2022 | Li | ......................... | H04W 72/23 |
| 2022/0116951 A1* | 4/2022 | Chen | ..................... | H04W 72/53 |

FOREIGN PATENT DOCUMENTS

| | | | | |
|---|---|---|---|---|
| WO | 2019098892 A1 | | 5/2019 | |
| WO | WO-2021035580 A1 * | | 3/2021 | ........... H04L 1/1896 |

OTHER PUBLICATIONS

PCT/CN2020/070324 , "International Preliminary Report on Patentability", PCT Application No. PCT/CN2020/070324, Jul. 14, 2022, 6 pages.

PCT/CN2020/070324 , "International Search Report and Written Opinion", PCT Application No. PCT/CN2020/070324, Sep. 16, 2020, 7 pages.

* cited by examiner

METHOD AND APPARATUS FOR RESOURCE RESERVATION FOR NR SIDELINK

TECHNICAL FIELD

Embodiments of the present application generally relate to wireless communication technology, especially to a method and an apparatus for resource reservation for 3GPP (3rd Generation Partnership Project) 5G new radio (NR) sidelink (SL).

BACKGROUND

Vehicle to everything (V2X) has been introduced into 5G wireless communication technology. In terms of a channel structure of V2X communication, a direct link between two user equipments (UEs) is called a sidelink (SL). Sidelink is a long-term evolution (LTE) feature introduced in 3GPP Release 12, and enables a direct communication between proximal UEs, and data does not need to go through a base station (BS) or a core network.

In 3GPP Release 16, a sidelink hybrid automatic repeat request-acknowledge (HARQ-ACK) report to BS is supported for better resource allocation, but only transport block (TB) based HARQ-ACK feedback is supported. 3GPP 5G NR aims to adopt a code block group (CBG) based sidelink transmission and a CBG based HARQ-ACK feedback mechanism. However, details regarding a CBG based sidelink transmission and a CBG based HARQ-ACK feedback mechanism have not been discussed in 3GPP 5G NR technology yet.

SUMMARY

Some embodiments of the present application provide a method for wireless communication performed by a user equipment (UE). The method includes: transmitting a CBG-based transmission on a sidelink (SL), wherein the CBG-based transmission includes one or more CBGs; receiving HARQ-ACK feedback corresponding to the one or more CBGs; and determining, based on contents of the HARQ-ACK feedback, whether there is resource(s) to be released during a CBG-based retransmission.

Some embodiments of the present application provide an apparatus. The apparatus includes: a non-transitory computer-readable medium having stored thereon computer-executable instructions, a receiving circuitry; a transmitting circuitry; and a processor coupled to the non-transitory computer-readable medium, the receiving circuitry and the transmitting circuitry, wherein the computer-executable instructions cause the processor to implement the abovementioned method for wireless communication performed by a UE.

Some further embodiments of the present application provide a method for wireless communication performed by a UE. The method includes: receiving sidelink control information (SCI) including an indicator, wherein the indicator indicates allocated resource(s) for a CBG-based transmission and a CBG-based retransmission, and the CBG-based transmission includes one or more CBGs; monitoring HARQ-ACK feedback corresponding to the one or more CBGs; and determining, based on the SCI and contents of the HARQ-ACK feedback, whether there is resource(s) to be available.

Some further embodiments of the present application provide an apparatus. The apparatus includes: a non-transitory computer-readable medium having stored thereon computer-executable instructions, a receiving circuitry; a transmitting circuitry; and a processor coupled to the non-transitory computer-readable medium, the receiving circuitry and the transmitting circuitry, wherein the computer-executable instructions cause the processor to implement the abovementioned method for wireless communication performed by a UE.

BRIEF DESCRIPTION OF THE DRAWINGS

In order to describe the manner in which advantages and features of the application can be obtained, a description of the application is rendered by reference to specific embodiments thereof, which are illustrated in the appended drawings. These drawings depict only example embodiments of the application and are not therefore to be considered limiting of its scope.

DETAILED DESCRIPTION

Figure 1:
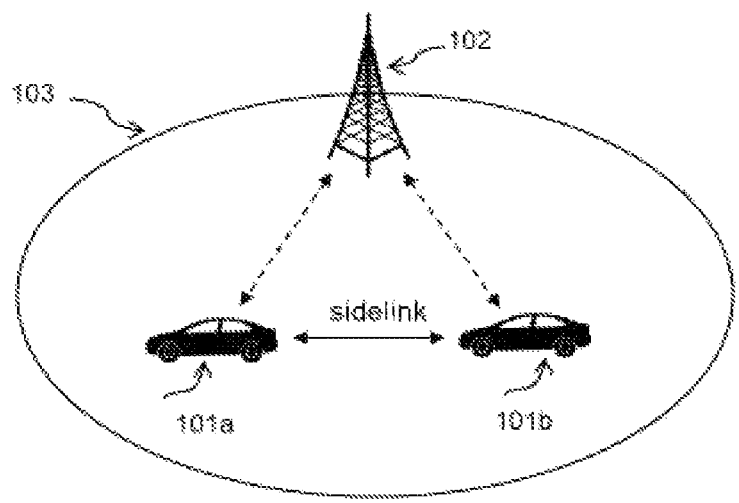
FIG. 1 illustrates an exemplary V2X communication system in accordance with some embodiments of the present application.

The detailed description of the appended drawings is intended as a description of preferred embodiments of the present application and is not intended to represent the only form in which the present application may be practiced. It should be understood that the same or equivalent functions may be accomplished by different embodiments that are intended to be encompassed within the spirit and scope of the present application.

Reference will now be made in detail to some embodiments of the present application, examples of which are illustrated in the accompanying drawings. To facilitate understanding, embodiments are provided under specific network architecture and new service scenarios, such as 3GPP 5G, 3GPP LTE Release 8 and so on. It is contemplated that along with developments of network architectures and new service scenarios, all embodiments in the present application are also applicable to similar technical problems; and moreover, the terminologies recited in the present application may change, which should not affect the principle of the present application.

UE(s) under NR V2X scenario may be referred to as V2X UE(s). A V2X UE, which transmits data according to sidelink resource(s) scheduled by a base station (BS), may be referred to as a UE for transmitting, a transmitting UE, a transmitting V2X UE, a Tx UE, a V2X Tx UE, a SL Tx UE, or the like. A V2X UE, which receives data according to sidelink resource(s) scheduled by a BS, may be referred to as a UE for receiving, a receiving UE, a receiving V2X UE, a Rx UE, a V2X Rx UE, a SL Rx UE, or the like.

V2X UE(s) may include computing devices, such as desktop computers, laptop computers, personal digital assistants (PDAs), tablet computers, smart televisions (e.g., televisions connected to the Internet), set-top boxes, game consoles, security systems (including security cameras), vehicle on-board computers, network devices (e.g., routers, switches, and modems), internet of things (IoT) devices, or the like.

According to some embodiments of the present application, V2X UE(s) may include a portable wireless communication device, a smart phone, a cellular telephone, a flip phone, a device having a subscriber identity module, a personal computer, a selective call receiver, or any other device that is capable of sending and receiving communication signals on a wireless network.

According to some embodiments of the present application, V2X UE(s) includes wearable devices, such as smart watches, fitness bands, optical head-mounted displays, or the like. Moreover, V2X UE(s) may be referred to as a subscriber unit, a mobile, a mobile station, a user, a terminal, a mobile terminal, a wireless terminal, a fixed terminal, a subscriber station, a user terminal, or a device, or described using other terminology used in the art. V2X UE(s) may communicate directly with BS(s) via uplink (UL) communication signals.

A BS under NR V2X scenario may be referred to as a base unit, a base, an access point, an access terminal, a macro cell, a Node-B, an enhanced Node B (eNB), a gNB, a Home Node-B, a relay node, a device, a remote unit, or by any other terminology used in the art. A BS may be distributed over a geographic region. Generally, a BS is a part of a radio access network that may include one or more controllers communicably coupled to one or more corresponding base stations.

A BS is generally communicably coupled to one or more packet core networks (PCN), which may be coupled to other networks, like the packet data network (PDN) (e.g., the Internet) and public switched telephone networks, among other networks. These and other elements of radio access and core networks are not illustrated but are well known generally by those having ordinary skill in the art. For example, one or more BSs may be communicably coupled to a mobility management entity (MME), a serving gateway (SGW), and/or a packet data network gateway (PGW).

A BS may serve a number of V2X UEs within a serving area, for example, a cell or a cell sector via a wireless communication link. A BS may communicate directly with one or more of V2X UEs via communication signals. For example, a BS may serve V2X UEs within a macro cell.

Sidelink communication between a Tx UE and a Rx UE under NR V2X scenario includes groupcast communication, unicast communication, or broadcast communication.

Embodiments of the present application may be provided in a network architecture that adopts various service scenarios, for example but is not limited to, 3GPP 3G, long-term evolution (LTE), LTE-Advanced (LTE-A), 3GPP 4G, 3GPP 5G NR (new radio), 3GPP LTE Release 12 and onwards, etc. It is contemplated that along with the 3GPP and related communication technology development, the terminologies recited in the present application may change, which should not affect the principle of the present application.

FIG. 1 illustrates an exemplary V2X communication system in accordance with some embodiments of the present application.

As shown in FIG. 1, the V2X communication system includes a base station, i.e., BS 102 and some V2X UEs, i.e., UE 101a and UE 101b. UE 101a and UE 101b may be configured to perform sidelink unicast transmission, sidelink groupcast transmission, or sidelink broadcast transmission. It is contemplated that, in accordance with some other embodiments of the present application, a V2X communication system may include more or fewer BSs, and more or fewer V2X UEs. Moreover, it is contemplated that names of V2X UEs (which represent a Tx UE, a Rx UE, and etc.) as illustrated and shown in FIG. 1 may be different, e.g., UE 101c, UE 104f, and UE 108g or the like.

In addition, although each V2X UE as shown in FIG. 1 is illustrated in the shape of a car, it is contemplated that a V2X communication system may include any type of UE (e.g., a roadmap device, a cell phone, a computer, a laptop, IoT (internet of things) device or other type of device) in accordance with some other embodiments of the present application.

According to some embodiments of FIG. 1, UE 101a functions as a Tx UE, and UE 101b functions as a Rx UE. UE 101a may exchange V2X messages with UE 101b through a sidelink, for example, PC5 interface as defined in 3GPP TS 23.303. UE 101a may transmit information or data to other UE(s) within the V2X communication system, through sidelink unicast, sidelink groupcast, or sidelink broadcast. For instance, UE 101a transmits data to UE 101b in a sidelink unicast session. UE 101a may transmit data to UE 101b and other UEs in a groupcast group (not shown in FIG. 1) by a sidelink groupcast transmission session. Also, UE 102 may transmit data to UE 101b and other UEs (not shown in FIG. 1) by a sidelink broadcast transmission session.

Alternatively, according to some other embodiments of FIG. 1, UE 101b functions as a Tx UE and transmits V2X messages, UE 101a functions as a Rx UE and receives the V2X messages from UE 101b.

Both UE 101a and UE 101b in the embodiments of FIG. 1 may transmit information to BS 102 and receive control information from BS 102, for example, via NR Uu interface. BS 102 may define one or more cells, and each cell may have a coverage area. As shown in FIG. 1, both UE 101a and UE 101b are within a coverage area 103 of BS 102.

BS 102 as illustrated and shown in FIG. 1 is not a specific base station, but may be any base station(s) in the V2X communication system. For example, if the V2X communication system includes two BSs 102, UE 101 being within a coverage area of any one the two BSs 102 may be called as a case that UE 101 is within a coverage of BS 102 in the V2X communication system; and only UE 101 being outside of coverage area(s) of both BSs 102 can be called as a case that UE 101 is outside of the coverage of BS 102 in the V2X communication system.

For 3GPP 5G NR V2X technology, if a CBG based sidelink transmission and a CBG based HARQ-ACK feedback mechanism is supported, the issue of how to perform resource reservation for CBG-based sidelink transmission needs to be addressed for Mode 2 in 3GPP Release 16. Currently, for a V2X communication system, details of a CBG based sidelink transmission and a CBG based HARQ-ACK feedback mechanism have not been defined.

Some embodiments of the present application provide a method for implementing a CBG-based HARQ-ACK feedback mechanism. Some embodiments of the present application provide a method for transmitting a CBG-based transmission on a SL. Some embodiments of the present application provide a method for receiving CBG-based HARQ-ACK feedback. Some embodiments of the present application provide a method for determining whether there is resource(s) to be released during a CBG-based retransmission.

Some embodiments of the present application provide an apparatus for implementing a CBG-based HARQ-ACK feedback mechanism. Some embodiments of the present application provide an apparatus for transmitting a CBG-based transmission on a SL. Some embodiments of the present application provide an apparatus for receiving CBG-based HARQ-ACK feedback. Some embodiments of the present application provide an apparatus for determining whether there is resource(s) to be released during a CBG-based retransmission.

Figure 4:
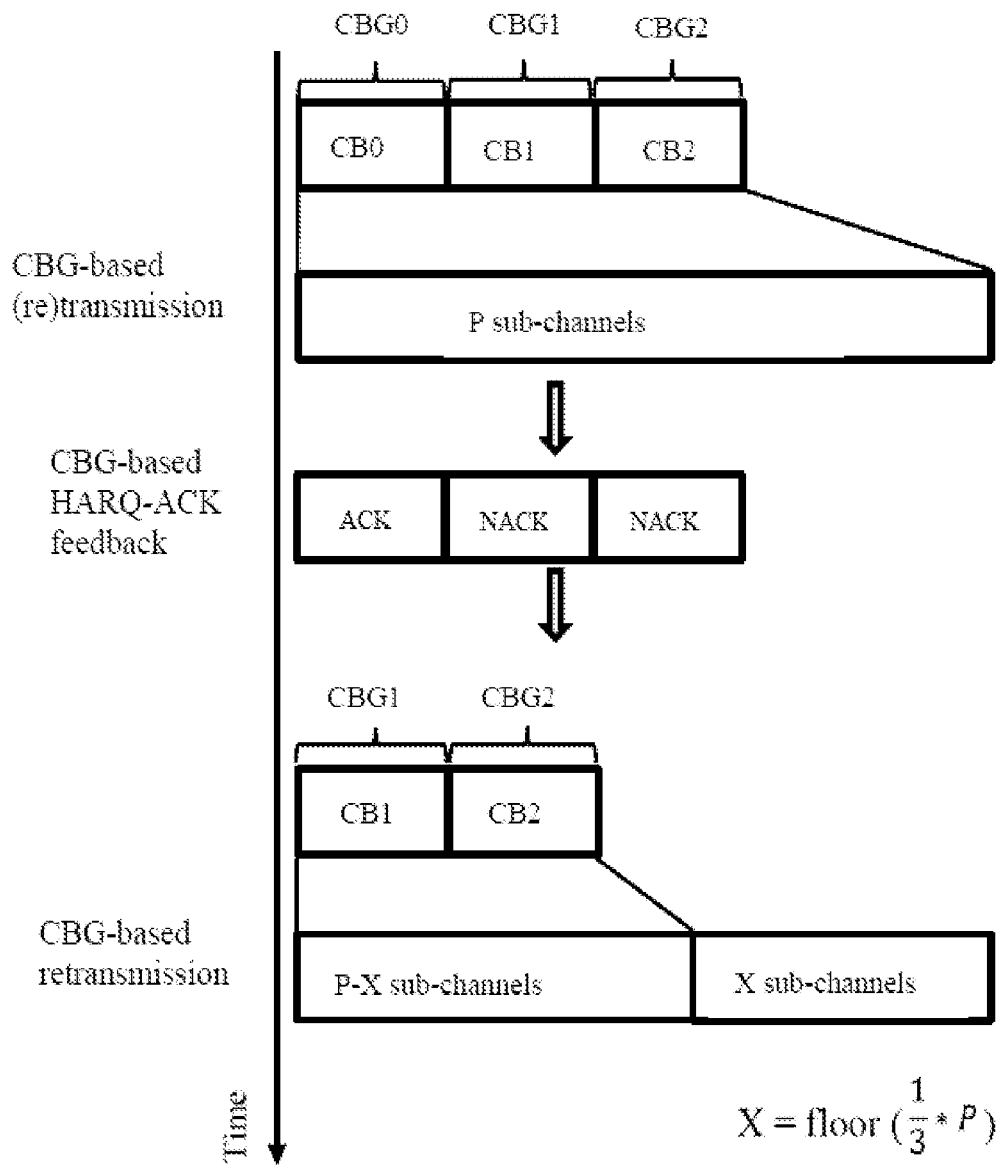
FIG. 4 illustrates an exemplary CBG transmission procedure in accordance with some embodiments of the present application.
Figure 5:
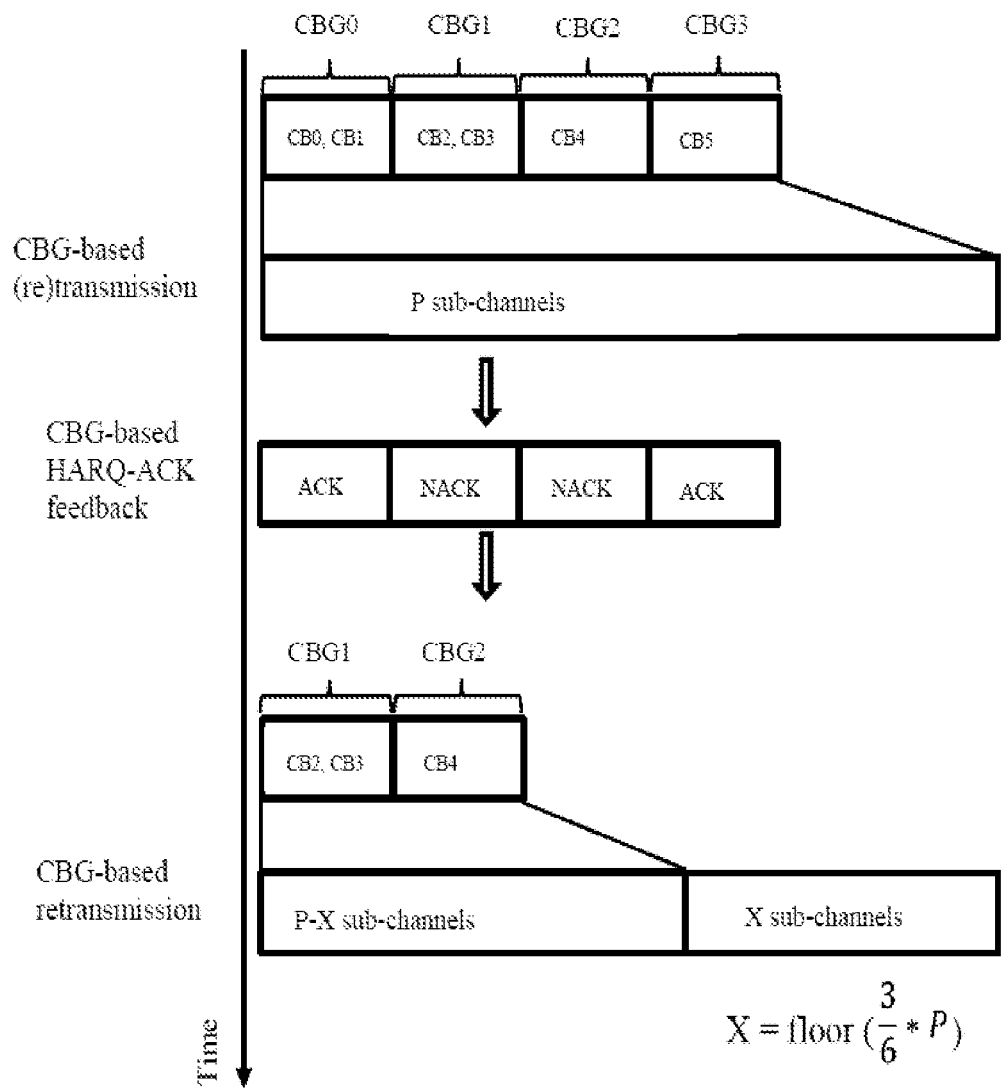
FIG. 5 illustrates a further exemplary CBG transmission procedure in accordance with some embodiments of the present application.
Figure 6:
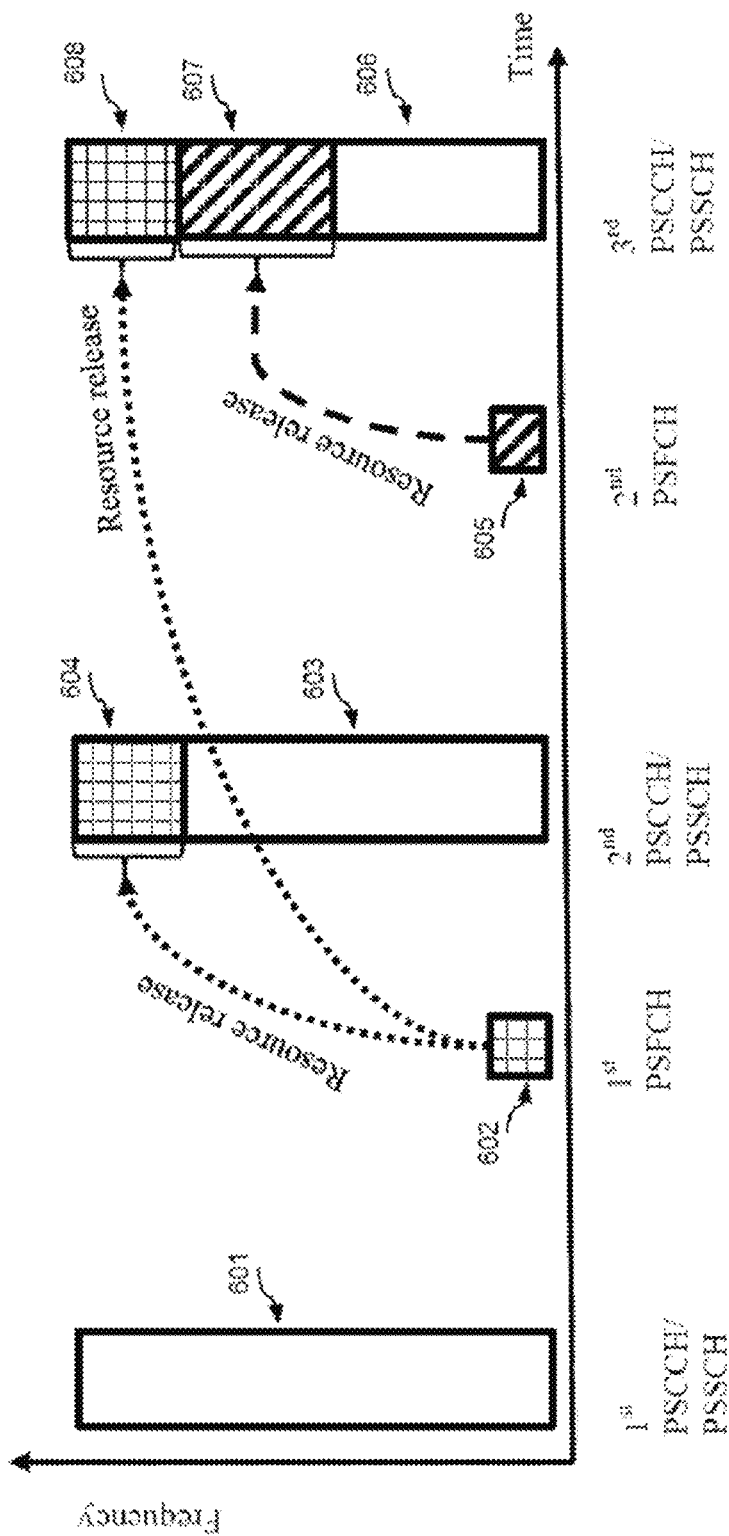
FIG. 6 illustrates another exemplary CBG transmission procedure in accordance with some embodiments of the present application.

In 3GPP 5G NR, a TB (transport block) includes a plurality of code blocks (CBs). Several code blocks in a TB are grouped into one code block group (CBG). Each CB within a CBG is independently decodable. A TB may include one or more CBGs, while each CBG in the TB may include different number of CBs. That is, one TB can be segmented to multiple CBGs, and each CBG may contain one or multiple CBs. Specific examples are shown in FIGS. 4-6 as below.

A TB which is not segmented into one or more CBGs may be transmitted in a V2X communication system. HARQ-ACK feedback for such TB may be named as TB-based HARQ-ACK feedback or TB based HARQ-ACK feedback, and may include ACK or NACK corresponding to the TB.

A TB including one or more CBGs may be transmitted in a V2X communication system. Such TB may be named as a CBG-based transmission or a CBG based transmission. HARQ-ACK feedback for such TB may be named as CBG-based HARQ-ACK feedback or CBG based HARQ-ACK feedback, and include ACK or NACK corresponding to each CBG or each CB in the TB.

Figure 2:
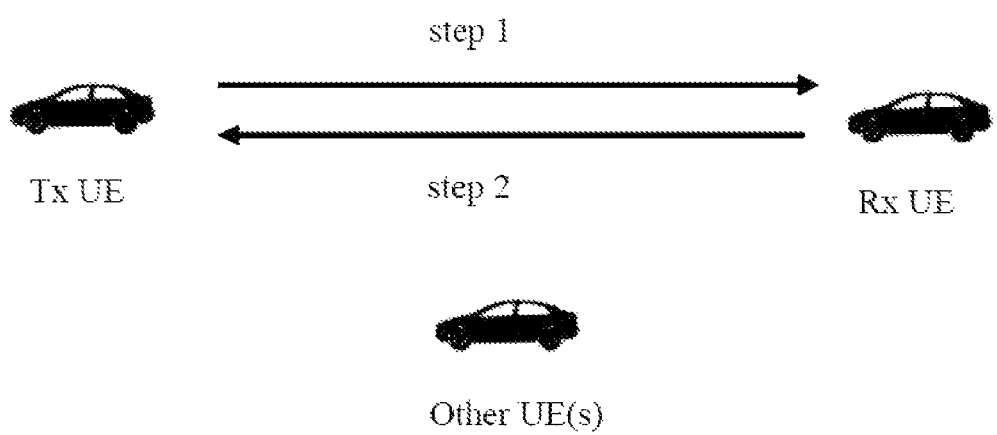
FIG. 2 illustrates a further exemplary V2X communication system in accordance with some embodiments of the present application.

FIG. 2 illustrates a further exemplary V2X communication system in accordance with some embodiments of the present application.

In the embodiments of FIG. 2, the V2X communication system includes a plurality of UEs, i.e., TX UE (e.g., UE 101a illustrated and shown in FIG. 1), and a RX UE (e.g., UE 101b illustrated and shown in FIG. 1), and other one or more UEs. The embodiments of FIG. 2 show a method procedure performed between the Tx UE and the Rx UE.

Specifically, the Tx UE performs sidelink transmission and enables a CBG based transmission and a CBG-based retransmission. In step 1 as shown in FIG. 2, the Tx UE may send a physical sidelink control channel (PSCCH) transmission or a physical sidelink shared channel (PSSCH) transmission to the Rx UE. The PSCCH transmission or the PSSCH transmission may include a CBG based transmission. The PSCCH transmission or the PSSCH transmission may include sidelink control information (SCI). The SCI may include CBG transmission information (CBGTI), to indicate which CBG(s) is transmitted in the CBG based transmission. There are two stages SCIs supported in 3GPP Release-16 NR sidelink. The CBGTI may be transmitted in $1^{st}$ stage SCI or $2^{nd}$ stage SCI. The SCI may also include an reservation indicator, to indicate resource(s) reserved for a CBG-based retransmission.

In step 2 as shown in FIG. 2, according to decoding results of the CBG based transmission, the Rx UE may transmit a physical sidelink feedback channel (PSFCH) transmission to the Tx UE. The PSFCH transmission may include HARQ-ACK feedback corresponding to the CBG based transmission. After receiving the PSFCH transmission, the Tx UE may transmit a CBG-based retransmission according to the HARQ-ACK feedback.

For instance, each transmission between the Tx UE and the Rx UE illustrated and shown in FIG. 2 (e.g., the PSCCH transmission or the PSSCH transmission in step 1 as illustrated and shown in FIG. 2) can contain one or more CBGs. The Rx UE can transmit CBG-based HARQ-ACK feedback (e.g., in step 2 as illustrated and shown in FIG. 2) in the PSFCH transmission to the Tx UE according to decoding results of the CBs.

Figure 3:
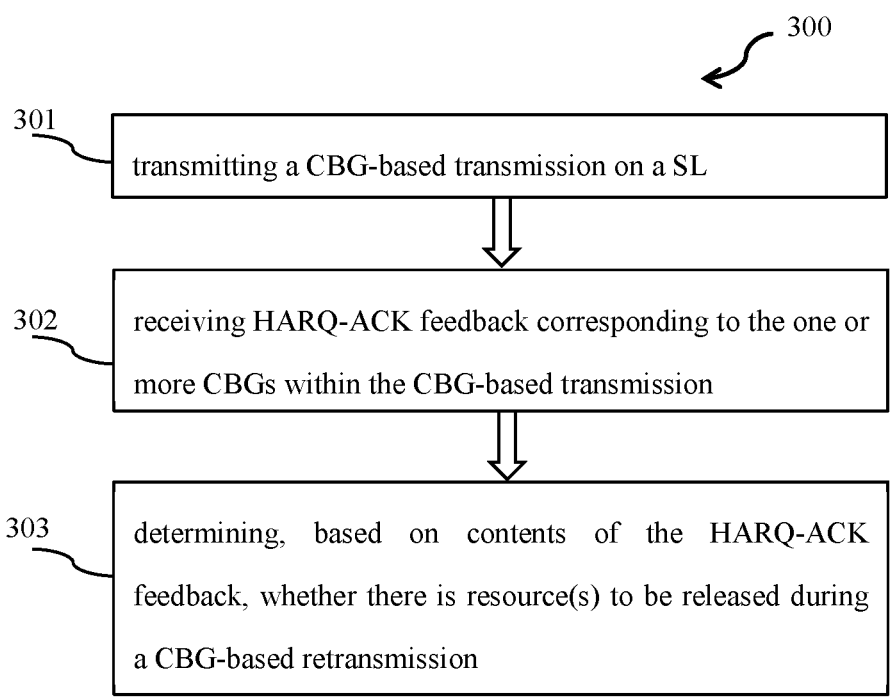
FIG. 3 illustrates an exemplary flow chart of a method for wireless communication in accordance with some embodiments of the present application.

FIG. 3 illustrates an exemplary flow chart of a method for wireless communication in accordance with some embodiments of the present application. The embodiments of FIG. 3 may be performed by a Tx UE (e.g., UE 101a or UE 101b illustrated and shown in FIG. 1, or the Tx UE illustrated and shown in FIG. 2).

In the exemplary method 300 as illustrated and shown in FIG. 3, in step 301, a Tx UE transmits a CBG-based transmission on a SL. The CBG-based transmission includes one or more CBGs. In step 302, the Tx UE receives HARQ-ACK feedback corresponding to one or more CBGs within the CBG-based transmission. In step 303, the Tx UE determines, based on contents of the HARQ-ACK feedback corresponding to one or more CBGs, whether there is resource(s) to be released during a CBG-based retransmission.

In some embodiments of the present application, in the exemplary method 300 as illustrated and shown in FIG. 3, the Tx UE further transmits sidelink control information (SCI). The SCI may include an indicator (e.g., an reservation indicator), to indicate resource(s) allocated for a CBG-based transmission and a CBG-based retransmission. The allocated resource(s) include the resource(s) to be released. The allocated resource(s) may also be named as the reserved resource(s).

For instance, the SCI indicates a location of the resource(s) to be released in time and frequency domains. The location of the resource(s) to be released is an edge of the allocated resource(s). If the allocated resource(s) are sub-channels, sub-channel(s) to be released may be located at an edge of allocated resources, so as to keep continuity of allocated sub-channels for PSSCH. For example, sub-channel(s) in the highest frequency portion of the allocated resource(s) may be released, or sub-channel(s) in the lowest frequency portion of the allocated resource(s) may be released.

The SCI may include an indicator to indicate whether a Tx UE will use the resource(s) to be released. This indicator may be one bit carried in the SCI. For example, one of values 0 and 1 of the bit represents that the Tx UE will use the resource(s) to be released, and the other one of the values 0 and 1 of the bit represents that the Tx UE will not use the resource(s) to be released. If this indicator indicates that the Tx UE will not use the resource(s) to be released, the resource(s) to be released can be used by another UE (for example, other UE(s) as illustrated and shown in FIG. 2).

For instance, in response to the indicator in the SCI indicating that the Tx UE will not use the resource(s) to be released, the resource(s) to be released may be used by another UE. Otherwise, in response to the indicator in the SCI indicating that the Tx UE will use the resource(s) to be released, the resource(s) to be released may be used by the Tx UE in a new CBG-based transmission.

In some embodiments of the present application, the CBG-based retransmission is not transmitted on the resource(s) to be released. The released resources can be used by a Tx UE. For example, the resource(s) to be released will be used by the Tx UE in a new CBG-based transmission.

In some other embodiments of the present application, the CBG-based retransmission is not transmitted on the resource(s) to be released, and the resource(s) to be released will be used by another UE which is different from the Tx UE. For this case, the abovementioned another UE should monitor the corresponding PSFCH resources. In one example, the abovementioned another UE is the Rx UE, and the resource(s) to be released will be used by the Rx UE. In a further example, the abovementioned another UE is a UE which is different from both the Tx UE and the Rx UE.

Whether a Tx UE will use the resource(s) to be released can be pre-configured. For example, a 3GPP standard document pre-defines whether a Tx UE will use the resource(s) to be released.

Alternatively, a Tx UE may determine whether the released resources can be used by other UE(s). For example, an indicator in the SCI can be transmitted to indicate whether a Tx UE would like to release resource(s) for other UEs (e.g., a Rx UE, or another UE which is different from the Tx UE or the Rx UE).

In some embodiments of the present application, in the exemplary method 300 as illustrated and shown in FIG. 3, the Tx UE further determines whether all bits included in the HARQ-ACK feedback corresponding to the one or more CBGs are acknowledgement (ACK). If all the bits included in the HARQ-ACK feedback corresponding to the one or more CBGs are ACK, the Tx UE may decide to release all the allocated resource(s). If at least one bit in the HARQ-ACK feedback corresponding to the one or more CBGs is non-acknowledgement (NACK), the Tx UE may decide that all of the allocated resource(s) are used by the CBG-based retransmission.

In one example, at least N bits are transmitted in PSFCH, and N is a total number of received CBGs. Each bit in N bits represents a result of decoding a CBG. If a Rx UE correctly decodes a certain CBG, the bit is 'ACK'; otherwise, the bit is 'NACK'. In the abovementioned embodiments, only all N bits are 'ACK', all the reserved resources can be released. That is, the resource(s) to be released are all the reserved resources. The resources to be released may be used by a Tx UE, a Rx UE, or other UE(s). Otherwise, in the abovementioned embodiments, if one bit within N bits is 'NACK', none of the reserved resources can be released, and all the reserved resources will be used by the Tx UE for a CBG-based retransmission.

In some embodiments of the present application, in the exemplary method 300 as illustrated and shown in FIG. 3, the Tx UE further determines a total number of the resource(s) to be released. The reserved resources for CBG-based retransmission which will be released can be determined based on the CBG based HARQ-ACK feedback.

According to some embodiments of the present application, a CBG-based transmission includes one or more CBGs, each CBG includes one or more CBs, and a total number of the resource(s) to be released is determined based on:

(1) a total number of successfully decoded CBs, wherein the total number of CBs successfully decoded is determined based on the HARQ-ACK feedback corresponding to the one or more CBGs;

(2) a total number of CBs actually transmitted on the SL, wherein the total number of CBs actually transmitted on the SL is determined based on the SCI; and (3) a total number of allocated resource(s) for the CBG-based transmission and a CBG-based retransmission.

According to some further embodiments of the present application, a CBG-based transmission includes one or more CBGs, each CBG includes one or more CBs, the resource(s) to be released is sub-channel(s) in frequency domain, and a total number of the resource(s) to be released is calculated by:

$$X = \text{floor}(M/N * P) \qquad (1)$$

wherein

X represents the total number of the sub-channel(s) to be released;

M represents a total number of successfully decoded CBs, wherein the total number of CBs successfully decoded is determined based on the HARQ-ACK feedback corresponding to the one or more CBGs;

N represents a total number of CBs actually transmitted on the SL, wherein the total number of CBs actually transmitted on the SL is determined based on the SCI; and P represents a total number of sub-channel(s) allocated for the CBG-based retransmission.

In short, in these embodiments, a granularity of released resource(s) is a sub-channel in frequency domain. This means that X sub-channels will be released based on the CBG-based HARQ-ACK feedback, and a value of X is determined by a total number of successful transmitted CBs and a total number of actually transmitted CBs on the SL.

In some embodiments of the present application, in the exemplary method 300 as illustrated and shown in FIG. 3, the Tx UE further computes a percentage of a total number of the resource(s) to be released within a total number of allocated resource(s) for the CBG-based transmission and the CBG-based retransmission; and in response to the percentage being equal to or greater than a threshold, the Tx UE decides to release the resource(s) to be released.

The threshold may be configured to enable partial resource release. For example, embodiments of the present application may configure that: only when X is equal to or greater than the threshold (i.e., X>=threshold), the corresponding sub-channels can be released, wherein X represents a total number of the corresponding sub-channel(s) to be released.

FIG. 4 illustrates an exemplary CBG transmission procedure in accordance with some embodiments of the present application. The embodiments of FIG. 4 illustrate a specific process of calculating a value of X in time domain.

In the embodiments of FIG. 4, a TB may be a CBG-based transmission or a CBG-based retransmission. The TB is segmented to three CBGs, and each CBG includes one CB. The TB is transmitted on P sub-channels in frequency domain, and P represents a total number of sub-channels allocated for the TB. In particular, as shown in FIG. 4, CBG0 includes CB0, CBG1 includes CB1, and CBG2 includes CB2. Accordingly, CB0, CB1, and CB2 are transmitted on the P sub-channels. As described above, a TB may include one or more CBGs, and one CBG in a TB may include different number of CBs according to some other embodiments of the present application.

In the embodiments of FIG. 4, in a case that a CBG-based HARQ-ACK feedback corresponding to CBG0, CBG1, and CBG2 are ACK, NACK, and NACK, respectively, a Tx UE may determine that CBG0 including CB0 has been successfully decoded by a Rx UE, and CBG1 including CB1 and CBG2 including CB2 need to be retransmitted on the SL between the Tx UE and the Rx UE. That is to say, a CBG-based retransmission will include CB1 and CB2.

As can be seen, in the embodiments of FIG. 4, M which represents a total number of successfully decoded CBs equals to 1, and N which represents a total number of CBs actually transmitted on the SL equals to 3. According to the equation (1), X which represents the total number of the sub-channel(s) to be released is calculated by:

$$X = \mathrm{floor}(\tfrac{1}{3} * P) \tag{2}$$

Thus, in the embodiments of FIG. 4, the CBG-based retransmission including CB1 and CB2 will be transmitted on P-X sub-channels, and X sub-channels will be released.

FIG. 5 illustrates a further exemplary CBG transmission procedure in accordance with some embodiments of the present application. The embodiments of FIG. 5 illustrate another specific process of calculating a value of X in time domain.

In the embodiments of FIG. 5, a TB may be a CBG-based transmission or a CBG-based retransmission. The TB is segmented to four CBGs, and each CBG includes different number of CBs. The TB is transmitted on P sub-channels in frequency domain, and P represents a total number of sub-channels allocated for the TB. In particular, CBG0 includes CB0 and CB1, CBG1 includes CB2 and CB3, CBG2 includes CB4, and CBG3 includes CB5. Accordingly, CB0, CB1, CB2, CB3, CB4, and CB5 are transmitted on P sub-channels. Similarly, as described above, a TB may include one or more CBGs, and one CBG in a TB may include different number of CBs according to some other embodiments of the present application.

As shown in FIG. 5, in a case that a CBG-based HARQ-ACK feedback corresponding to CBG0 to CBG3 are ACK, NACK, NACK, and ACK, respectively, a Tx UE may determine that CBG0 (which includes CB0 and CB1) and CBG3 (which includes CB5) have been successfully decoded by a Rx UE, and CBG1 (which includes CB2 and CB3) and CBG2 (which includes CB4) need to be retransmitted on the SL between the Tx UE and the Rx UE. That is to say, a CBG-based retransmission will include CB2, CB3, and CB4.

As can be seen, in the embodiments of FIG. 5, M which represents a total number of successfully decoded CBs corresponds to a total number of successfully decoded CB0, CB1, and CB5 and equals to 3, and N which represents a total number of CBs actually transmitted on the SL corresponds to a total number of CB0 to CB5 and equals to 6. According to the equation (1), X which represents the total number of the sub-channel(s) to be released is calculated by:

$$X = \mathrm{floor}(\tfrac{3}{6} * P) \tag{3}$$

Thus, in the embodiments of FIG. 5, the CBG-based retransmission including CB2, CB3, and CB4 will be transmitted on P-X sub-channels, and X sub-channels will be released.

In some embodiments of the present application, SCI indicates one or more resources in time domain reserved for the CBG-based retransmission. In the exemplary method 300 as illustrated and shown in FIG. 3, the Tx UE may further release the same number of sub-channels from each of one or more resources in time-domain reserved for the CBG-based retransmission, in response to determining that there is the resource(s) to be released.

FIG. 6 illustrates another exemplary CBG transmission procedure in accordance with some embodiments of the present application.

In the embodiments of FIG. 6, resources in time domain and frequency domain are used by data transmissions and HARQ-ACK feedback transmissions (e.g., $1^{st}$ PSFCH and $2^{nd}$ PSFCH). For example, a CBG-based transmission may be transmitted on $1^{st}$ PSCCH or PSSCH, $2^{nd}$ PSCCH or PSSCH, or $3^{rd}$ PSCCH or PSSCH, which may also be represented as $1^{st}$ PSCCH/PSSCH, $2^{nd}$ PSCCH/PSSCH, and $3^{rd}$ PSCCH/PSSCH as shown in FIG. 6.

In particular, as shown in FIG. 6, a CBG-based transmission is transmitted on $1^{st}$ PSCCH/PSSCH which is marked as 601. There are two reserved resource occasions for a CBG-based retransmission. For instance, a CBG-based retransmission may be transmitted on $2^{nd}$ PSCCH/PSSCH and $3^{rd}$ PSCCH/PSSCH. Then, the corresponding HARQ-ACK feedback is transmitted on $1^{st}$ PSFCH marked as 602.

Based on the contents of the $1^{st}$ PSFCH, a Tx UE may determine a total number of resource(s) to be released during a CBG-based retransmission on $2^{nd}$ PSCCH/PSSCH. That is to say, a Tx UE may determine a value of X in accordance with the equation (1) based on the contents of the $1^{st}$ PSFCH. After that, resources in time and frequency domains in both the two reserved resource occasions for a CBG-based retransmission, i.e., the resources marked as 604 and 608, will be released according to the value of X based on the contents of the $1^{st}$ PSFCH.

Based on the contents of the $1^{st}$ PSFCH, the Tx UE transmits a CBG-based retransmission on a resource in time and frequency domains (which is marked as 603) in $2^{nd}$ PSCCH/PSSCH. There is one reserved resource occasion for this CBG-based retransmission. For instance, another CBG-based retransmission may be transmitted on $3^{rd}$ PSCCH/PSSCH, e.g., in a resource in time and frequency domains marked as 606. Then, the corresponding HARQ-ACK feedback is transmitted on $2^{nd}$ PSFCH marked as 605.

Based on the contents of the $2^{nd}$ PSFCH, the Tx UE may determine a total number of resource(s) to be released during the abovementioned another CBG-based retransmission on $3^{rd}$ PSCCH/PSSCH. That is to say, the Tx UE may determine a value of X in accordance with the equation (1) based on the contents of the $2^{nd}$ PSFCH. After that, a resource in the reserved resource occasion of $3^{rd}$ PSCCH/PSSCH, i.e., the resource in time and frequency domains marked as 607, will be released according to the value of X based on the contents of the $2^{nd}$ PSFCH.

Figure 7:
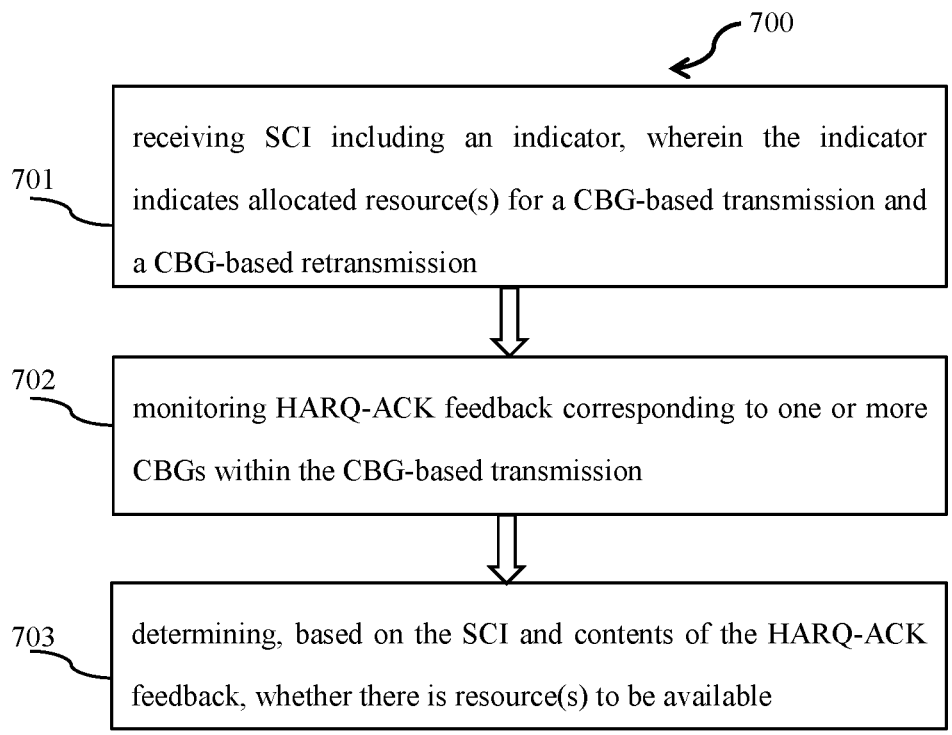
FIG. 7 illustrates a further exemplary flow chart of a method for wireless communication in accordance with some embodiments of the present application.

FIG. 7 illustrates a further exemplary flow chart of a method for wireless communication in accordance with some embodiments of the present application. The embodiments of FIG. 7 may be performed by a UE which is different from both a Tx UE and a Rx UE (e.g., other UE(s) illustrated and shown in FIG. 2).

In the exemplary method 700 as illustrated and shown in FIG. 7, in step 701, a UE receives SCI including an indicator which indicates allocated resource(s) for a CBG-based transmission and a CBG-based retransmission. The CBG-based transmission or the CBG-based retransmission includes one or more CBGs. In step 702, the UE monitors HARQ-ACK feedback corresponding to one or more CBGs within the CBG-based transmission. In step 703, the UE determines, based on the SCI and contents of the HARQ-ACK feedback, whether there is resource(s) to be available.

By performing steps illustrated and shown in FIG. 7, the UE which is different from both a Tx UE and a Rx UE may determine whether the Tx UE will release resource(s) during a CBG-based retransmission, and such resource(s) to be released will be available for the UE. In other words, resource(s) to be released from a perspective of a Tx UE correspond to resource(s) to be available from a perspective of a UE, which is different from both a Tx UE and a Rx UE.

Details described in all other embodiments of the present application (for example, details regarding determining whether there is resource(s) to be released) are applicable for the embodiments of FIG. 7 to determine whether there is resource(s) to be available. Moreover, details described in the embodiments of FIG. 7 are applicable for all the embodiments of FIGS. 1-6.

Figure 8:
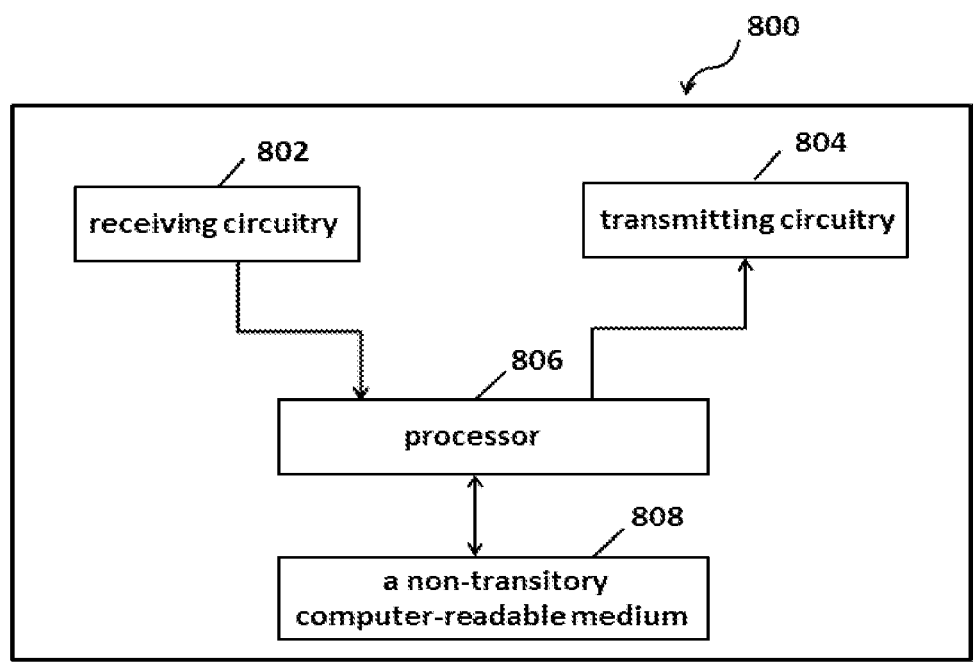
FIG. 8 illustrates a block diagram of an exemplary apparatus in accordance with some embodiments of the present application.

FIG. 8 illustrates a block diagram of an exemplary apparatus in accordance with some embodiments of the present application. Referring to FIG. 8, the apparatus 800 includes a receiving circuitry 802, a transmitting circuitry 804, a processor 806, and a non-transitory computer-readable medium 808. The processor 806 is coupled to the non-transitory computer-readable medium 808, the receiving circuitry 802, and the transmitting circuitry 804.

It is contemplated that some components are omitted in FIG. 8 for simplicity. In some embodiments, the receiving circuitry 802 and the transmitting circuitry 804 may be integrated into a single component (e.g., a transceiver).

In some embodiments, the non-transitory computer-readable medium 808 may have stored thereon computer-executable instructions to cause a processor to implement the operations with respect to BS(s) as described above. For example, upon execution of the computer-executable instructions stored in the non-transitory computer-readable medium 808, the processor 806 and the transmitting circuitry 804 perform the method of FIG. 3, including: transmitting a CBG-based transmission on a SL, wherein the CBG-based transmission includes one or more CBGs; receiving HARQ-ACK feedback corresponding to the one or more CBGs; and determining, based on contents of the HARQ-ACK feedback, whether there is resource(s) to be released during a CBG-based retransmission.

In some embodiments, the non-transitory computer-readable medium 1308 may have stored thereon computer-executable instructions to cause a processor to implement the operations with respect to Tx UE(s) as described above. For example, upon execution of the computer-executable instructions stored in the non-transitory computer-readable medium 808, the processor 806 and the transmitting circuitry 804 perform the method of FIG. 7, including: receiving SCI including a first indicator, wherein the first indicator indicates allocated resource(s) for a CBG-based transmission and a CBG-based retransmission, and the CBG-based transmission includes one or more CBGs; monitoring HARQ-ACK feedback corresponding to the one or more CBGs; and determining, based on the SCI and contents of the HARQ-ACK feedback, whether there is resource(s) to be available.

The method of the present application can be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which there resides a finite state machine capable of implementing the flowcharts shown in the figures may be used to implement the processor functions of the present application.

Those having ordinary skills in the art would understand that the steps of a method described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. Additionally, in some aspects, the steps of a method may reside as one or any combination or set of codes and/or instructions on a non-transitory computer-readable medium, which may be incorporated into a computer program product.

While this disclosure has been described with specific embodiments thereof, it is evident that many alternatives, modifications, and variations may be apparent to those skilled in the art. For example, various components of the embodiments may be interchanged, added, or substituted in the other embodiments. Also, all the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising."

What is claimed is:

1. A method performed by a user equipment (UE), the method comprising:
    transmitting a code block group (CBG)-based transmission on a sidelink (SL), wherein the CBG-based transmission includes one or more CBGs;
    receiving hybrid automatic repeat request-acknowledge (HARQ-ACK) feedback corresponding to the one or more CBGs;
    determining, based at least in part on contents of the HARQ-ACK feedback, whether there are one or more resources to be released during a CBG-based retransmission, wherein the one or more resources are a percentage of a plurality of resources allocated for at least one of the CBG-based transmission or the CBG-based retransmission; and
    releasing the one or more resources based at least in part on the percentage satisfying a threshold value.

2. The method of claim 1, comprising:
    transmitting sidelink control information (SCI), wherein the SCI includes a first indicator that indicates one or more allocated resources for the CBG-based transmission and the CBG-based retransmission, and the one or more allocated resources include the one or more resources to be released.

3. A user equipment (UE) for wireless communication, comprising:
- at least one memory; and
- at least one processor coupled with the at least one memory and configured to cause the UE to:
  - transmit a code block group (CBG)-based transmission on a sidelink (SL), wherein the CBG-based transmission includes one or more CBGs;
  - receive hybrid automatic repeat request-acknowledge (HARQ-ACK) feedback corresponding to the one or more CBGs;
  - determine, based at least in part on contents of the HARQ-ACK feedback, whether there are one or more resources to be released during a CBG-based retransmission, wherein the one or more resources are a percentage of a plurality of resources allocated for at least one of the CBG-based transmission or the CBG-based retransmission; and
  - release the one or more resources based at least in part on the percentage satisfying a threshold value.

4. The UE of claim 3, wherein the at least one processor is further configured to cause the UE to:
- transmit sidelink control information (SCI), wherein the SCI includes a first indicator that indicates the plurality of resources, and wherein the plurality of resources include the one or more resources to be released.

5. The UE of claim 4, wherein the at least one processor is further configured to cause the UE to:
- determine whether all bits included in the HARQ-ACK feedback corresponding to the one or more CBGs are decoded successfully;
- in response to all the bits included in the HARQ-ACK feedback corresponding to the one or more CBGs being decoded successfully, release the plurality of resources; or
- in response to at least one bit in the HARQ-ACK feedback corresponding to the one or more CBGs not being decoded successfully, refrain from releasing the plurality of resources based at least in part on the plurality of resources being used by the CBG-based retransmission.

6. The UE of claim 4, wherein the SCI indicates a location of the one or more resources to be released in a time domain and a frequency domain.

7. The UE of claim 6, wherein the location of the one or more resources to be released is an edge of the plurality of resources.

8. The UE of claim 4, wherein the at least one processor is further configured to cause the UE to:
- determine a total number of the one or more resources to be released.

9. The UE of claim 8, wherein each of the one or more CBGs includes one or more code blocks (CBs), and wherein the total number of the one or more resources to be released is determined based at least in part on:
- a total number of successfully decoded CBs, wherein the total number of successfully decoded CBs is determined based at least in part on the HARQ-ACK feedback corresponding to the one or more CBGs;
- a total number of CBs transmitted on the SL, wherein the total number of CBs transmitted on the SL is determined based at least in part on the SCI; and
- a total number of resources of the plurality of resources.

10. The UE of claim 8, wherein the one or more resources to be released include one or more sub-channels in a frequency domain, and wherein the total number of the one or more resources to be released is calculated by:

$$X = \mathrm{floor}(M/N*P),$$

wherein: X represents the total number of the one or more sub-channels to be released;
- M represents a total number of successfully decoded CBs, wherein the total number of successfully decoded CBs is determined based at least in part on the HARQ-ACK feedback corresponding to the one or more CBGs;
- N represents a total number of CBs transmitted on the SL, wherein the total number of CBs transmitted on the SL is determined based at least in part on the SCI; and
- P represents a total number of sub-channel(s) allocated for the CBG-based retransmission.

11. The UE of claim 4, wherein the SCI includes a second indicator to indicate whether the UE will use the one or more resources to be released.

12. The UE of claim 11, wherein the second indicator is a bit carried in the SCI, and wherein one of values 0 and 1 of the bit represents that the UE will use the one or more resources to be released and another one of the values 0 and 1 of the bit represents that the UE will not use the one or more resources to be released.

13. The UE of claim 11, wherein, in response to the second indicator indicating that the UE will not use the one or more resources to be released, the one or more resources to be released are used by another UE.

14. The UE of claim 4, wherein the SCI indicates at least one resource in a time domain reserved for the CBG-based retransmission.

15. The UE of claim 14, wherein the at least one processor is further configured to cause the UE to:
- in response to determining that the one or more resources are to be released, release a same number of sub-channels from the at least one resource in the time domain.

16. The UE of claim 3, wherein the at least one processor is further configured to cause the UE to refrain from using the one or more resources to be released to transmit the CBG-based retransmission.

17. The UE of claim 3, wherein the at least one processor is further configured to cause the UE to refrain from using the one or more resources to be released to transmit the CBG-based retransmission, wherein the one or more resources to be released are used by another UE.

18. The UE of claim 3, wherein to satisfy the threshold value, the percentage is equal to or greater than the threshold value.

19. A user equipment (UE) for wireless communication, comprising:
- at least one memory; and
- at least one processor coupled with the at least one memory and configured to cause the UE to:
  - receive sidelink control information (SCI) including a first indicator, wherein the first indicator indicates a plurality of resources allocated for at least one of a CBG-based transmission or a CBG-based retransmission, and wherein the CBG-based transmission includes one or more CBGs;
  - monitor hybrid automatic repeat request-acknowledge (HARQ-ACK) feedback corresponding to the one or more CBGs; and
  - determine, based at least in part on the SCI and contents of the HARQ-ACK feedback, whether there are one or more resources available, wherein the one or more resources are a percentage of the plurality of resources allocated for at least one of the CBG-based transmission or the CBG-based retransmission, and wherein the one or more resources are available based at least in part on the percentage satisfying a threshold value.

20. A processor for wireless communication, comprising:
at least one controller coupled with at least one memory and configured to cause the processor to:
  transmit a code block group (CBG)-based transmission on a sidelink (SL), wherein the CBG-based transmission includes one or more CBGs;
  receive hybrid automatic repeat request-acknowledge (HARQ-ACK) feedback corresponding to the one or more CBGs;
  determine, based at least in part on contents of the HARQ-ACK feedback, whether there are one or more resources to be released during a CBG-based retransmission, wherein the one or more resources are a percentage of a plurality of resources allocated for at least one of the CBG-based transmission or the CBG-based retransmission; and
  release the one or more resources based at least in part on the percentage satisfying a threshold value.

* * * * *